United States Patent
Van Weert

[15] 3,642,441
[45] Feb. 15, 1972

[54] TREATMENT OF METAL CHLORIDES IN FLUIDIZED BEDS

[72] Inventor: Gezinus Van Weert, Richmond Hill, Ontario, Canada

[73] Assignee: Falconbridge Nickel Mines Limited, Toronto, Ontario, Canada

[22] Filed: Sept. 14, 1967

[21] Appl. No.: 667,695

[52] U.S. Cl. .................................. 23/183, 23/200, 23/201, 23/145, 23/140, 23/155
[51] Int. Cl. ............... C01b 13/14, C01g 53/04, C01g 49/02
[58] Field of Search ................ 23/183, 155, 1 F, 182 V, 139, 23/140, 200, 201, 145, 182, 202

[56] References Cited

UNITED STATES PATENTS

| | | | |
|---|---|---|---|
| 3,401,032 | 9/1968 | Renzoni et al. | 75/1 |
| 2,155,119 | 4/1939 | Ebner | 23/183 X |
| 2,642,339 | 6/1953 | Sawyer | 23/200 |
| 2,989,373 | 6/1961 | Llewelyn et al. | 23/183 |
| 3,440,009 | 4/1969 | Flood et al. | 23/200 X |
| 3,466,021 | 9/1969 | Van Weert et al. | 23/202 V X |
| 3,130,008 | 4/1964 | Stokes et al. | 23/140 |
| 3,251,650 | 5/1966 | Bengtson et al. | 23/201 |

FOREIGN PATENTS OR APPLICATIONS

| | | | |
|---|---|---|---|
| 1,080,439 | 8/1967 | Great Britain | 23/183 |
| 269,514 | 7/1964 | Australia | 23/140 |

*Primary Examiner*—M. Weissman
*Attorney*—Maybee and Legris

[57] ABSTRACT

A method and apparatus for thermal treatment of solid particles in fluidized beds and carrying out of heat treatments and other reactions therein at elevated temperatures such as formation of metal oxides by the endothermic reaction of metal chlorides with water. An explosive mixture of gases is supplied to a fluidized bed of solid particles in a reactor as a multiplicity of separated streams, each stream is maintained at a temperature below the ignition temperature of the mixture by cooling a portion thereof outside the reactor, and at a velocity greater than the ignition velocity of the mixture by supplying the mixture under sufficient pressure, and the mixture is then combusted in the bed to produce hot fluidizing gases, thereby maintaining the bed in a fluidized condition at an elevated temperature and providing a suitable environment for the conduct of heat treatments and other reactions.

17 Claims, 8 Drawing Figures

INVENTOR.
GEZINUS VAN WEERT
BY Maybee & Legris
ATTORNEYS

INVENTOR.
GEZINUS VAN WEERT
BY Maybee & Legris
ATTORNEYS

TREATMENT OF METAL CHLORIDES IN FLUIDIZED BEDS

BACKGROUND OF THE INVENTION

Gas pressure fluctuation within fluidized beds is a well-recognized phenomenon in the art of fluidization. The magnitude, speed and regularity of pressure fluctuation are functions of many variables including the size and shape of the fluidized bed, the size of the particles comprising the bed and the size distribution thereof, the density and shape of the particles, the density and viscosity of the fluidizing gas, and the space velocity of the gas through the fluidized bed. In fluidized beds of relatively dense coarse oxide particles, e.g., iron oxide or nickel oxide granules with bulk densities of about 4 g./cm.$^3$ and between about 8 and 100 Tyler mesh in size, for example, pressure fluctuations are substantial, rapid and irregular, and pressures are commonly established instantaneously that are considerably higher or lower than the mean pressure. Such changes in bed pressure are reflected by changes in the pressure of the fluidizing gas in the duct or ducts through which the gas is supplied to the bottom of the bed, so that, under the influence of an instantaneous high pressure in the bed, for example, the velocity of the fluidizing gas in the ducts can be substantially decreased. Thus, when the fluidizing gas is explosive and the fluidized bed is hot, an explosion hazard exists, since, if the ignition velocity of the gas exceeds the velocity of the gas entering the bed, backfiring or explosions will occur that might result in serious damage or injury.

It is common practice in the existing art, therefore, either firstly to combust gases in a chamber below the hearth of a fluidized bed reactor on which the fluidized bed is supported or secondly to deliver fuel and oxygen, or other exothermically reactive gases separately into the fluidized bed for mixing and combusting therein. Both these procedures have serious disadvantages for certain applications of fluidized beds. In the first instance, considerable heat is lost in the combustion chamber below the hearth of the reactor, and in the hearth itself, that is consequently unavailable in the fluidized bed to satisfy the requirements of endothermic reactions therein. Moreover, a temperature gradient is established that can lead to defluidization as a result of the sticking of relatively cool fluidized bed particles to the relatively hot static surface of the hearth. Furthermore, the maximum temperature of the gas is limited by the materials of construction of the hearth and thus the maximum rate of heat input to the bed and the throughput of the reactor are also limited thereby. In the second instance, local reducing and oxidizing conditions exist near the separate fuel and oxygen inlets respectively, or other concentration gradients are established with other gases that can result in unwanted and even disastrous side reactions or effects such as reduction, oxidation, sticking and defluidization. Thus, there have not been until now any known means for the safe delivery of an explosive mixture of gases into a hot fluidized bed of particles, which bed is characterized by substantial, rapid and irregular fluctuations in pressure whereby controlled, homogeneous and efficient combustion in the bed can be attained.

Another problem which has confronted the art of operating commercial size fluidized bed reactors has been the initial establishment of the hot, fluidized bed, a procedure which has been in the past a considerable nuisance and quite time consuming. One well-known practice has been to charge a bed of sand particles onto the hearth, heat the surface of this bed and the surrounding refractory walls by the heat from an auxiliary burner in the sidewall or freeboard of the reactor, periodically bump the bed with air to expose a fresh surface for heating and continue in this manner until the bed is hot enough that fuel oil injected directly therein ignites and burns in contact with separately injected fluidizing air. When the fluidized bed reaches a suitable temperature the desired chemical process that is to be carried out therein is initiated but the sand must then be replaced by the product of the process, an operation that is not only slow but also, in theory, never fully completed. Before the bed is hot enough that injected fuel can be ignited therein, the heating rate is about 25° F. per hour and afterward is about 200° F. per hour, an emphatic testimony to the advantage of generating heat, if possible, directly within the fluidized bed itself. It can be seen that the generation of heat, in accordance with prior art practices by direct fuel injection into fluidized beds depends, per se, not only on the existence of an established fluidized bed in which the separately injected fuel and air can become mixed, but also on a bed which is already hot enough that combustion of the mixture can be initiated.

There is a market in the metallurgical industry for metal oxides in a dense, coarse granular form that can be handled readily and used as such or in the form of metal after reduction by alloy manufacturers, electroplaters and others. The term granular as used in the present specification refers to coarse particles that are within the size range of about 8 to 100 Tyler mesh. Well-recognized source materials from which to produce metal oxides are metal chlorides but one of the major disadvantages of the existing art relating to the conversion of metal chlorides to oxides is that substantially all the oxide produced thereby is of extremely small particle size in the micron and submicron range, and can be used only for applications such as the manufacture of pigments. Furthermore, existing oxide processes depend almost exclusively on oxygen for conversion of the metal chloride, thereby producing chlorine that cannot be used directly for the generation of chlorides by processes that rely on hydrochloric acid, such as the HCl-leaching of metal-bearing concentrates, e.g., the process described in U.S. Pat. No. 3,085,054, and the HCl-pickling of steel. In treating metal chlorides from such sources the conversion of chloride to oxide is advantageously effected with oxygen that is already combined with hydrogen as water thereby producing HCl that can be recycled directly for the generation of metal chlorides. Existing conversion processes require that the metal chloride be supplied for reaction in gaseous form and therefore apply only to chlorides such as $TiCl_4$, $SiCl_4$, $ZrCl_4$, $FeCl_3$ and others that boil below about 350° C. and are therefore commonly referred to as " volatile chlorides." Nonvolatile chlorides, such as $NiCl_2$, $FeCl_2$ and $CoCl_2$, that are of interest in the present case, do not even melt below about 650° C. and can therefore be conveniently supplied for conversion as solids or aqueous chloride solutions.

Processes have been developed recently in the prior art for the recovery of hydrochloric acid and iron oxide from spent steel pickling liquors. In one commercial process fuel, air and spent steel pickling liquor are each supplied separately to a fluidized bed of iron oxide particles and mixed and reacted therein to produce hydrogen chloride and what is referred to as "granular" iron oxide. The particle size of this so-called granular oxide is actually so small, however, that substantially all the oxide is carried out of the reactor by the exhaust gases and is recovered in cyclones. Attempts to produce in a fluidized bed truly granular metal oxides from metal chlorides having high boiling points, which can be drawn substantially as a product directly from the bed without substantial entrainment in exhaust gases, have so far been unsuccessful in the art.

In British Pat. No. 866,363 treatment of a titanium tetrahalide with oxygen in a fluidized bed to produce titanium dioxide and chlorine is disclosed. The product is apparently coarse enough that a portion remains in the bed but the product is not truly granular and there is constant buildup of solids on the apparatus necessitating periodic shutdowns in bed operation. Furthermore, there is substantially no generation of hydrogen chloride and none of the problems associated with the treatment of high boiling point metal chlorides is disclosed or solved. On the contrary, a combustible gas and an oxygen-containing gas are each fed separately to the fluidized bed and burned therein. Such procedure used in the conversion of high boiling point metal chlorides to metal oxides in a fluidized bed causes reduction of metal oxide particles locally around the combustible gas inlet and sticking together of the resulting metal particles thereby leading to eventual defluidization of the bed.

In U.S. Pat. No. 2,723,904 ferric chloride is reacted in a fluidized bed of oxide with steam to form iron oxide and hydrogen chloride. Again, however, no suggestion is made of converting high boiling point chlorides, such as $FeCl_2$, $NiCl_2$ and $CoCl_2$, to oxides and the problems associated therewith. Also, in the process of this patent a multiplicity of superimposed beds is required. Furthermore, heat is provided for the $FeCl_3$—$H_2O$ reaction by burning fuel gas outside the bed, a procedure which would result in unacceptable heat losses in supplying the large amounts of heat necessary for the highly endothermic reactions involved between the high boiling point metal chlorides and steam. Burning of fuel gas directly in the bed is necessary for such reactions and the severe problems associated therewith have been set forth hereinbefore.

In British Pat. No. 703,142 a process is described for recovering ferrous chloride crystals from pickle liquor, and reacting the crystals with steam to form iron oxide and hydrogen chloride. There is no teaching in this patent, however, of treating the ferrous chloride crystals in a fluidized bed, much less the production of a granular product therefrom.

Other prior art processes disclose the production of metal oxides by reaction of metal chlorides with oxygen-containing gases in a fluidized bed while burning fuel gas to provide necessary heat but in most of these processes finely divided oxides are produced and heat is supplied by burning fuel gas outside the bed or by separately feeding fuel gas and oxygen to the bed. The problems involved with feeding an explosive mixture of gases to a hot fluid bed are not disclosed or solved. In U.S. Pat. No. 3,043,660 finely divided silica is formed by the reaction of $SiCl_4$ and oxygen in a fluidized bed. Fuel gas and excess oxygen are separately injected and then burned to supply heat. Similarly, in U.S. Pat. No. 2,823,982 finely divided metal oxides are produced from metal chlorides in a fluidized bed, and a combustible gas and excess oxygen are burned in the bed if heat is required. The combustible gas and oxygen are normally introduced separately, however, and if any oxygen is introduced with the combustible gas an explosive mixture is specifically avoided. U.S. Pat. No. 1,983,943 relates to a fluidized bed process for the low-temperature carbonization of finely divided coal particles in which a mixture of combustible gas and oxygen is supplied to the bed for reaction therein to supply heat. The operation is marked, however, by very even pressure conditions with none of the substantial, rapid and irregular pressure fluctuations that occur during the fluidization of relatively coarse, dense, oxide particles.

SUMMARY

The invention relates broadly to a method and apparatus for thermal treatment of a fluidized bed of solid particles in a reactor by combustion of an explosive mixture of gases therein. The reactor comprises a chamber enclosed by a gastight shell, the chamber having an insulated hearth for support of the bed, means for feeding solid particles to the chamber, means for removing solid particles from the chamber, means for controlling the depth of the bed in the chamber and thereby defining a lower fluidized bed zone and an upper freeboard zone, an exhaust duct in the upper freeboard zone for removal of gas, and the improvement comprising a header remote from the shell but connected thereto by a plurality of separated conduits passing through the shell and the insulated hearth and terminating at the upper surface thereof, each conduit having a portion between the header and the shell exposed for cooling the conduit and maintaining the temperature of the mixture therein below its ignition temperature, inlet means attached to the header for delivering thereto the explosive mixture of gases at a temperature less than the ignition temperature thereof, and means for delivering the mixture to the header at such pressure that the velocity of the mixture in each conduit is greater than its ignition velocity. Solid particles, such as metal oxide particles, are heated and fluidized in the bed in contact with the gases produced by combustion of the explosive mixture therein. The invention further relates to a method for conducting heat treatments and other reactions at elevated temperatures in the hot fluidized bed of solid particles such as reaction of metal chlorine with water to form metal oxide granules in a hot fluidized bed of dense metal oxide granules in a hot fluidized bed of dense metal oxide granules characterized by substantial, rapid and irregular fluctuations in pressure. Metal chloride and water are supplied to the hot fluidized bed and reacted therein in contact with the oxide granules to produce and deposit fresh adherent metal oxide on the surfaces of the granules and to form hydrogen chloride. The dense metal oxide granules and hydrogen chloride are then separately recovered from the fluidized bed. The metal oxide granules produced according to this invention are not only dense and coarse but also have substantially smooth and rounded surfaces.

It is an object of the present invention to provide improved method and apparatus for thermal treatment of solid particles in a fluidized bed by combustion of an explosive mixture of gases therein. It is a further object to provide improved means for the conduct of heat treatments and other reactions at elevated temperatures in hot fluidized beds of solid particles.

Other objects and advantages of the invention will become apparent from the description following taken in conjunction with the accompanying drawing.

DESCRIPTION OF THE PREFERRED EMBODIMENTS

Figure 2:
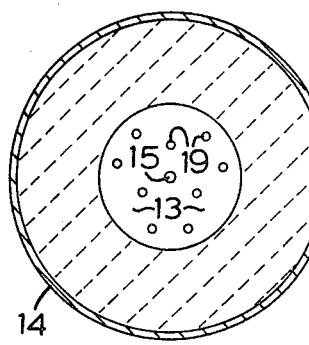
FIG. 2 is a sectional plan view through line 2—2 of FIG. 1.

The invention relates to a method and apparatus for the thermal treatment of solid particles in a fluidized bed by delivering an explosive mixture of gases into a hot fluidized bed of particles in a reactor and combusting the mixture therein in contact with the solid particles in the bed to provide in situ the heat required to conduct a variety of heat treatments and other reactions within the fluidized bed at elevated temperatures. The invention is particularly useful for the endothermic conversion of metal chlorides by water in a fluidized bed of oxide particles to form granular metal oxides and hydrogen chloride. Chlorides of the iron group of metals, i.e., iron, cobalt and nickel, are most advantageously treated. The explosive mixture consisting of a fuel and a free oxygen-containing gas is passed under pressure to the reactor at a temperature below the ignition temperature thereof and at a velocity greater than the ignition velocity thereof. In the conversion of metal chlorides with water the chloride and water are fed to the fluidized bed and reacted therein in intimate contact with fluidized metal oxide particles to deposit fresh adherent metal oxide on the surfaces of the particles and simultaneously to generate hydrogen chloride gas, the hydrogen chloride being separately recovered from the metal oxide particles which are in the form of smooth, dense, dust-free, readily handled granules. The burning explosive mixture of fuel and free-oxygen-containing gas provides the heat necessary for the endothermic reaction. As described hereinafter, the explosive mixture of gases is delivered to the reactor in a novel and special way.

Thus, the explosive mixture of gases prepared outside the reactor at a temperature below the ignition temperature of the mixture is divided into a multiplicity of separated streams each of which is directed into the fluidized bed at velocities sufficiently exceeding the ignition velocity of the mixture to prevent backfiring due to pressure fluctuations in the bed. A portion of each stream outside the reactor is exposed for cooling and maintaining the stream at a temperature below the ignition temperature of the mixture. The explosive mixture of gases is ignited within the bed and hot fluidizing gases are generated therein. Solid particles are fed to the reactor and are simultaneously heated and fluidized by contact with the hot fluidizing gases.

The fluidized bed reactor has an insulated refractory hearth at the bottom of the fluidized bed section supported by a gastight reactor shell and the hearth contains a plurality of conduits through which fluidizing gases are delivered to the reactor. There are means for feeding solid or liquid reactants to the bed such as metal chloride as a solid or as an aqueous solution, and means for removing solid product, such as metal oxide, therefrom. A header is located outside of and remote from the reactor shell and inlet means is attached to the header for the supply thereto of an explosive mixture of gases under pressure. A multiplicity of gas conduits connects the header with the bottom of the fluidized bed and the conduits each have an exposed portion between the header and the reactor shell and a portion through the reactor shell and hearth, the shell and header being kept apart by the exposed portions of the conduits between them. Attached to the header is means for supplying an explosive mixture of gases thereto at elevated pressure whereby the velocity of gas flowing in each conduit is greater than the ignition velocity of the explosive gases.

Reference herein to an explosive mixture of gases means any mixture of a fuel and a free oxygen-containing gas that will support an open stable flame and which, if ignited in a confined space, will explode. Ignition velocity is defined herein as being the speed at which a flame front moves through an explosive mixture of gases immediately after ignition. This speed is sometimes referred to as the burning velocity of the mixture and is a function of the properties of the gases comprising the mixture and of the temperature and pressure thereof. The ignition velocity of a stoichiometric mixture of air and propane for complete combustion is 45 cm./sec. at atmospheric pressure and room temperature, for example, but decreases with pressure to 37 cm./sec. at 0.4 atm. and increases with temperature to about 60 cm./sec. at 400° K. Thus, the term is used in any given case in reference to the particular conditions existing in that case. Ignition temperature is defined herein as being the temperature to which an explosive mixture of gases must be heated to permit spontaneous ignition thereof and is sometimes referred to as the ignition point or the autoignition temperature. The ignition temperature of propane in the presence of air is about 470° C., for example, and ranges between about 200° and 530° C. for other paraffin hydrocarbons.

The method and apparatus of the invention are found to be particularly useful for the conversion of nonvolatile metal chlorides by water to dense, coarse, granular oxide particles between about 8 and 100 Tyler mesh in size and characterized by substantially smooth and rounded surfaces. The heat required to effect the endothermic conversion is advantageously supplied in accordance with the aforedescribed and hereinafter-described novel procedures. Treatment of nonvolatile metal chlorides, such as nickel chloride, ferrous chloride and cobalt chloride, in accordance with the invention can be carried out in the apparatus shown in FIG. 1 of the drawing, which is a simplified sketch of a vertical section through a fluidized bed reactor and special gas entry means therefor embodying the invention and FIG. 2 which is a sectional plan view through line 2—2 of FIG. 1. The reactor has a lower fluidized bed zone 10, an upper freeboard zone 11, and exhaust duct 12 for the removal of gases from the reactor, an insulated hearth 13, which preferably is refractory, at the bottom of the fluidized bed zone 10 supported by a reactor shell 14, feed means 15 for feeding metal chloride to the reactor and discharge means 16 for removing metal oxide from the reactor.

Gas entry means 17, including header 18 and a plurality of conduits 19, are described in detail hereinafter with reference to FIGS. 3 to 7. In the reactor shown in FIGS. 1 and 2 the conduits 19 are nine in number, arranged as shown in the plan view of FIG. 2, the feed means 15 being in the center of the arrangement. A fuel gas and a free oxygen-containing gas are separately pressurized by compressor means 20 and 21 respectively and then mixed and passed as an explosive mixture under pressure into the header 18, through the conduits 19, having exposed sections 22, and into the fluidized bed zone 10 of the reactor. Metal chloride particles are advantageously fed pneumatically into the bottom of the fluidized bed zone using a noncontaminating gas, such as nitrogen or air, through the feed means 15. Alternatively, the metal chloride may be fed down inclined feedpipe 23 (shown in broken line). Pneumatic feeding upwardly through the hearth of the reactor has, however, been found to be most advantageous. If the chloride is in the form of an aqueous solution it can be fed as a stream or spray onto the top of the bed through feedpipe 24 (shown in broken line) or pneumatically through the hearth of the reactor. The top of the fluidized bed is advantageously maintained at the top of the fluidized bed zone 10 to avoid possible accretions along the walls thereof, with granular metal oxide product being drawn through the discharge pipe 16 located at the top of the fluidized bed. Product may be drawn, if desired, from discharge pipes located lower in the fluidized bed zone such as by discharge pipe 25, shown in broken line at the bottom of the fluidized bed zone 10.

Granular metal oxide product discharged through the pipe 16 is passed over screen 26 to provide an oversize product fraction and an undersize fraction that is recycled to the reactor through feedpipe 27. The exhaust gases discharged through the exhaust duct 12 are treated for the recovery of dust and hydrogen chloride therefrom.

Figure 1:
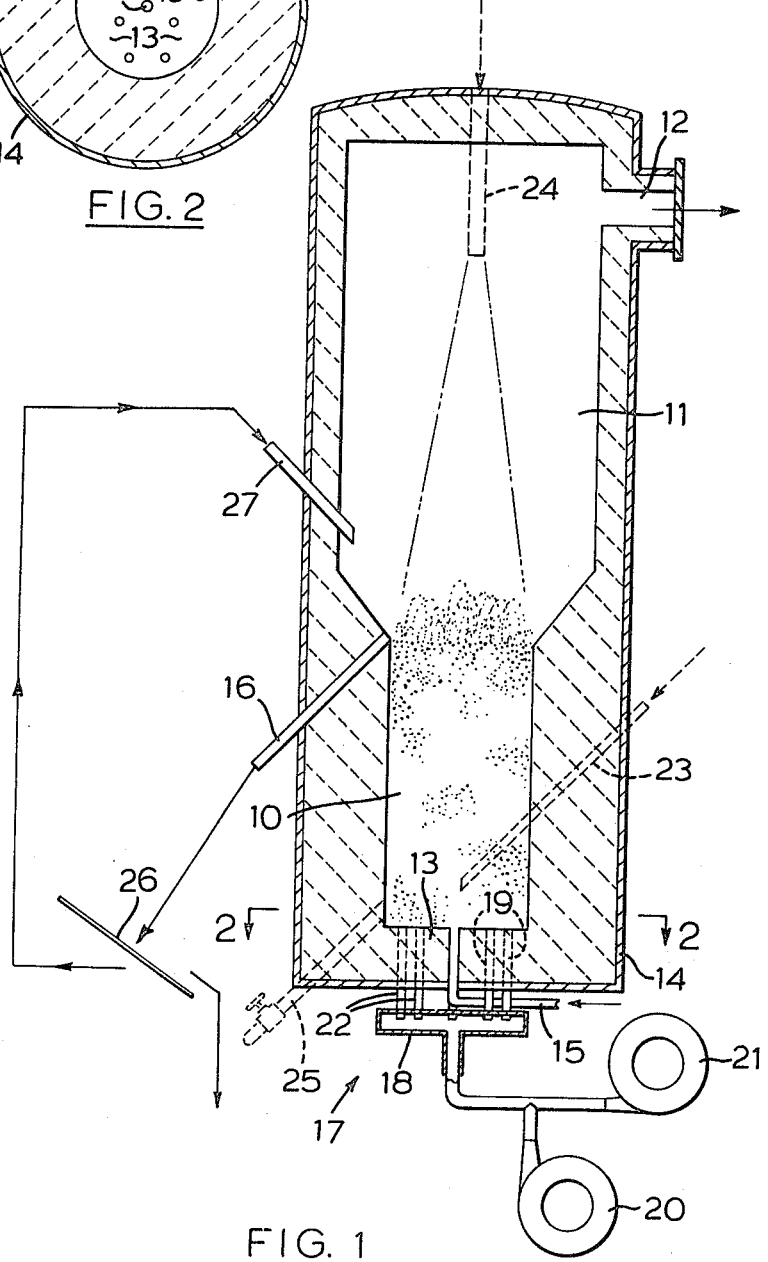
FIG. 1 is an elevational sectional view of a fluidized bed reactor, including gas entry means therefor embodying the present invention, in which the process of the invention may be carried out.

In carrying out the method of the invention, such as in the apparatus shown in FIGS. 1 and 2, a fluidized bed of dense, coarse oxide particles, between about 8 and 100 Tyler mesh and predominantly in a narrow size range between, for example, about 20 to 65 Tyler mesh, is established in the fluidized bed zone and the particles are heated to and maintained at an elevated temperature and in a fluidized state with hot fluidizing gases. Fluidization of such dense, coarse particles causes frequent pressure fluctuations in the bed and results in ejection of particles therefrom into the freeboard zone where they are cooled to some extent before falling back into the bed. An explosive mixture of a fuel gas and a free oxygen-containing gas is prepared outside the fluidized bed reactor at a temperature below the ignition temperature of the mixture. The explosive mixture is divided into a multiplicity of separated streams contained within the conduits 19, each stream having the portion 22 between the header and the shell exposed for cooling the conduit and maintaining the temperature of the mixture therein below its ignition temperature. Each stream is directed into the bottom of the fluidized bed at a velocity exceeding the ignition velocity of the mixture to prevent backfiring that might result from frequent pressure fluctuations in the fluidized bed. The explosive mixture of gases ignites within the reactor and hot fluidizing gases are generated therein which maintain the bed in a fluidized condition at an elevated temperature. In the treatment of metal chlorides one or more metal chlorides and water are fed to the fluidized bed and reacted within the bed in contact with the oxide particles to produce and deposit fresh, adherent metal oxide on the surfaces of the oxide particles and form hydrogen chloride gas. Dense, coarse, smooth, free-flowing metal oxide granules and the hydrogen chloride are separately recovered from the fluidized bed reactor.

Figure 3:
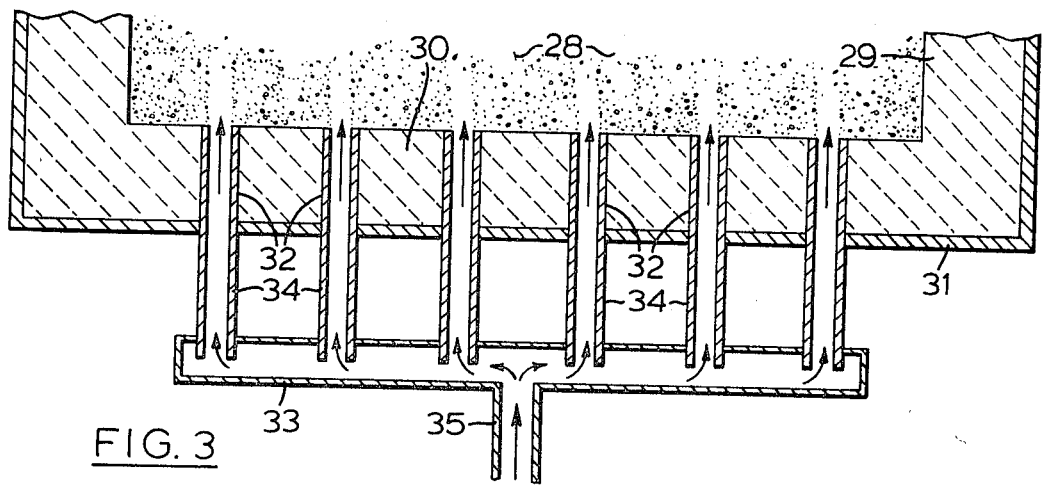
FIG. 3 is a simplified sectional view in elevation of the lower hearth portion of a fluidized bed reactor and gas entry means therefor embodying the invention.
Figure 4:
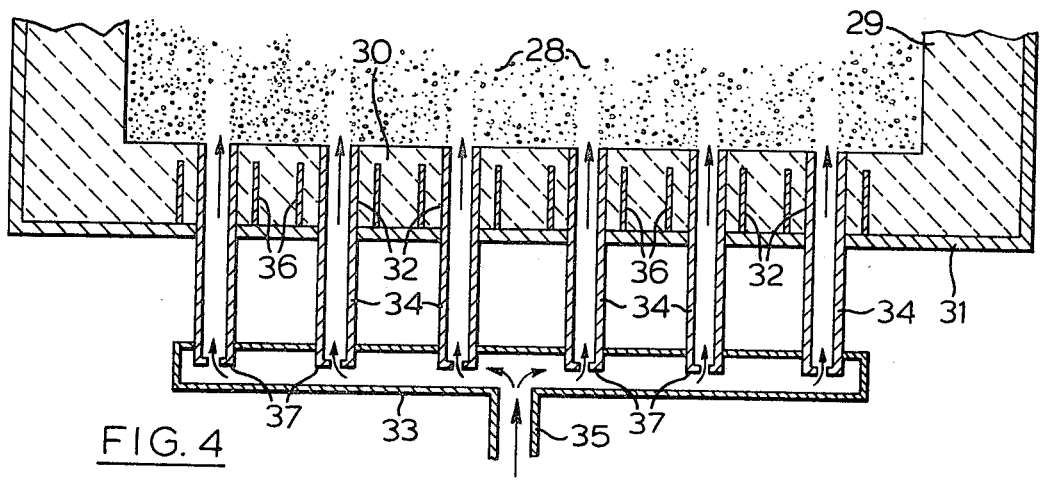
FIG. 4 is a sectional view, similar to that shown in FIG. 3, of a preferred gas entry means and hearth portion of a fluidized bed reactor embodying the invention.

Referring to FIGS. 3 and 4 of the drawings, simplified sketches of gas entry means to a fluidized bed reactor embodying the invention similar to the entry means of FIGS. 1 and 2 are shown. In FIGS. 3 and 4 the lower portion of a fluidized bed 28 is shown confined on the sides by an insulated refractory lining 29 and supported by an insulated refractory hearth 30, all of which are contained within a gastight reactor shell 31. Projecting through the hearth 30 is a plurality of conduits 32, one end of each conduit open to the bottom of the fluidized bed and the other end attached to a header 33. The conduits 32 have exposed portions 34 between the shell 31 and the header 33. A conduit 35 provides means by which an explosive mixture of gases is delivered under pressure to the header 33. Delivery of an explosive mixture of gases to a fluidized bed operating at elevated temperature and characterized by substantial, rapid and irregular fluctuations in pressure is normally a very difficult and dangerous procedure because of the possibility of severe and dangerous backfiring in the conduits. It has been found that such backfiring is eliminated under normal operating circumstances by maintaining the header remote from the shell as schematically shown in FIGS. 3 and 4. Presumably, the exposed portions 34 of the conduits 32 permit cooling thereof to maintain the temperature of the explosive mixture of gases therein below its ignition temperature.

The explosive mixture of gases flows under pressure from the header 33, through the conduits 32 and into the bottom of the fluidized bed through the hearth section 30 and is instantly ignited by the hot fluidized particles and combusted in contact therewith. The has pressure is sufficient in relation to the dimensions of the conduits that the gas enters the fluidized bed at velocities in excess of its ignition velocity even under the greatest pressure established during operation of the fluidized bed. To avoid backfiring in the conduit, it is necessary not only that the velocity of the gas exceed its ignition velocity but that its temperature be less than its ignition temperature, and the arrangements described with reference to FIGS. 3 and 4 provide these conditions. It can be appreciated that an obvious means for cooling the conduits 32 would be by water jacketing the conduits, and/or the shell, and/or the header but such arrangement would be impractical in a commercial size reactor.

Abnormal situations can occur from time to time, however, that can result in unusually high conduit temperatures or decreased gas velocities or both and which might lead ultimately to backfiring. Additional means are therefore provided in a further embodiment of this invention to eliminate or to minimize the extent and effect of these occurrences. Because of the relatively high gas pressures in beds of dense, coarse solid particles it can happen, for example, that uncombusted gas in the reactor flows down into gaps between the walls of the conduits and the adjacent refractory lining of the hearth where it combusts and heats the conduits. Such gas leaks can be decreased to some extent by the known expedient of providing hooks on the shell of the reactor to hold the refractory lining in tight contact therewith, but can be substantially eliminated by surrounding the conduits with larger impervious tubes 36 embedded in the hearth and attached in gas tight relation to the reactor shell 31 by welding, for example, to act as gas checks, as shown in FIG. 4. Under these circumstances any gas flow is limited to the relatively slow process of diffusion.

In addition to heat transfer to the atmosphere, the conduits 32 are also cooled by the gas flowing therein and it will therefore be readily appreciated that any decrease in the gas flow is accompanied by an increase in conduit temperature. Thus, if one of the conduits 32 becomes damaged or partially blocked, for example, or for any reason the velocity of the gas therein is decreased, the likelihood of backfiring is greater than exists in an undamaged or unblocked conduit. Such heating is readily detected by monitoring the temperature of the exposed part 34 of the conduits with thermocouples, temple sticks or other temperature detecting devices and, means are provided to prevent or minimize backfiring that might result if overheating occurs. Thus, at least part of the exposed portion of each conduit is comprised of ductile metal pipe, such as copper, that can be readily crimped to cut off all gas flow therein, thereby effectively eliminating the possibility of backfire in an overheated conduit without significantly affecting the overall pattern of fluidization in the reactor.

It is possible in extreme circumstances, however, for backfire to occur before the conduit can be crimped shut. It is also possible that in such an event the gas at the header-end of the conduit is cold enough to quench the flashback initially and prevent it from proceeding into the header where an explosion might occur, but without remedial action backfiring might recur continually until the conduit is so hot that the gas will finally flash back into the header. It is therefore desirable to extend the period of time between the initial backfire and flashback into the header so that sufficient time is available to crimp the conduit before flashback can occur. It has been found, surprisingly, that flashback is substantially eliminated by provision of a constricted portion in the conduit through which the gas must pass between the header and the rest of the conduit. This constricted portion is advantageously located in that portion of a conduit outside the reactor shell and preferably in the header-end of the conduit. The effect of the constriction is to increase the velocity of the gas to speeds substantially greater than those in the unconstricted part of the conduit thereby necessitating extreme blockage of the conduit before flashback into the header can occur. Also, the colder the gas in the constriction, the more effective is the quenching action of the high-speed gas therein and hence the desirability of the constriction in the header-end of the conduit. In FIG. 4 a constriction 37 is shown located at the header-end of each conduit 32 to provide this advantageous feature.

Although blockage of a conduit is usually a sufficient gradual process that with the safety precautions provided by this invention as described hereinbefore a blocked conduit can be taken out of service before an explosion can occur in the header, it is presumably possible for an extreme blockage to occur so rapidly that an explosion would occur in spite of these precautions. The likelihood of such an event is substantially negligible but it is still advisable, as an additional safety precaution, to ensure that the internal volume of the header is as small as is practicable to minimize any explosion therein and also that the header is constructed of material that is sufficiently strong to withstand the force of such an explosion.

In the practice of the present invention no backfiring has occurred in undamaged or unblocked conduits and with a constricted portion in the conduits no explosions have occurred in the header when abnormal and uncontrolled situations have arisen. Thus, the invention provides means not only for the delivery of an explosive mixture of gases safely into a hot fluidized bed characterized by substantial, rapid and irregular fluctuations in pressure and operating under normal conditions but also for the prevention of explosions that might otherwise take place due to abnormal conditions that might occur from time to time.

Figure 5:
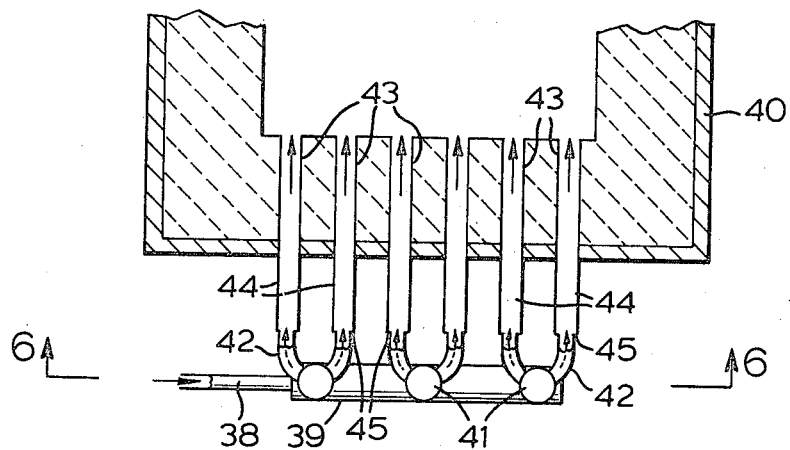
FIG. 5 is a sectional view in elevation of a header arrangement for gas entry means to a fluidized bed reactor, also embodying the invention and shown in simple detail.
Figure 6:
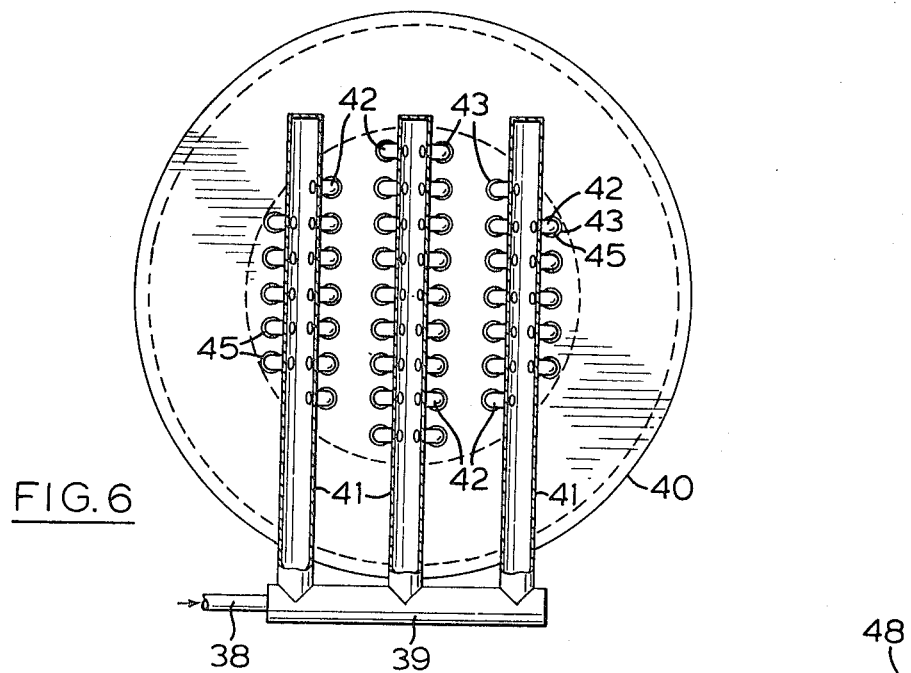
FIG. 6 is a plan view of the arrangement shown in FIG. 5 through line 6—6 thereof.

FIG. 5 is an elevational view and FIG. 6 is a sectional view through line 6—6 of FIG. 5 of an embodiment of the invention in a commercial-size reactor in which dozens or hundreds of conduits might be required. An explosive mixture of gases is fed through a gas inlet or conduit 38 to a manifold or conduit 39 located to one side of and below reactor 40. From the manifold 39 the gas mixture flows into a plurality of further conduits 41 attached at right angles to the manifold 39 and positioned under the reactor 40. The gas then flows from the conduits 41 into pairs of conduits 42, evenly spaced therealong, and thence through conduits 43 attached thereto, which project through the shell and hearth of the reactor to the bottom of the fluidized bed. The conduits 43 have exposed portions 44 between the conduit 42 and the shell of the reactor 40 and thus correspond to conduits 32 in FIGS. 3 and 4 while the entire assembly from the manifold 39 to the conduits 42 inclusive is, in effect, a header which provides the same function as the header 33 shown in FIGS. 3 and 4. Restrictions 45 in the lower ends of conduits 43, similar to the restrictions 37 in FIG. 4, are shown in FIG. 5.

Figure 7:
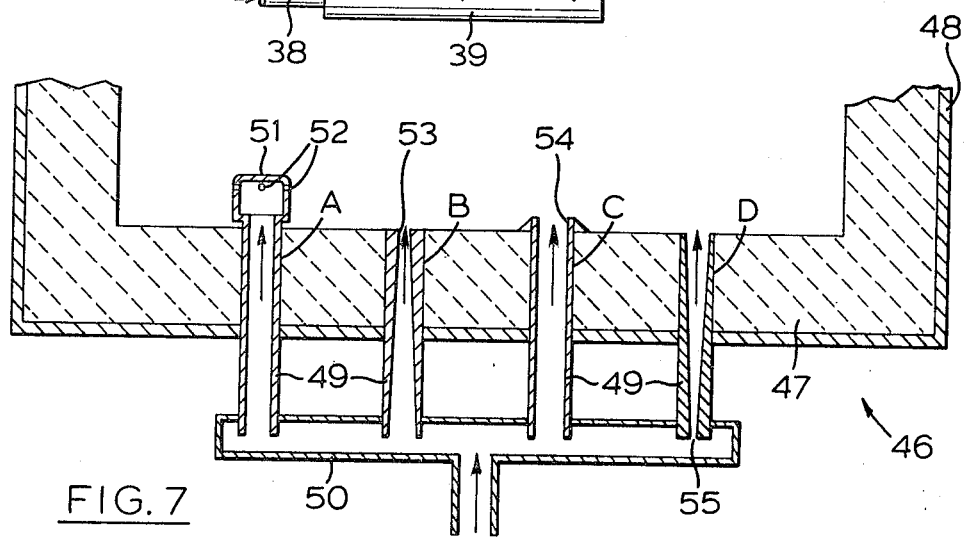
FIG. 7 is an elevational sectional view, shown in simple detail, of a gas entry means for a fluidized bed reactor embodying the invention and illustrating various conduits which may be used with the invention.

The conduits projecting through the hearth are shown as straight tubes in FIGS. 3 through 6. Several modifications of this basic type are shown in FIG. 7 which is an elevational, sectional view of the lower hearth end of a reactor 46 having a hearth bottom 47 and a reactor shell 48. Four conduits A, B, C, D are shown with exposed portions 49 between header 50 and the reactor shell 48. The reactor end of the conduit A is covered with a cap 51 provided with several ports 52 through which the gas enters the fluidized bed. The caps 51 are intended to serve two purposes: to prevent particles falling into the conduits during shutdown of the bed, and to improve gas distribution and hence fluidization characteristics during operation of the bed. It has been found in the present case, however, that even with uncapped conduits, the bed can be shut down and restarted with no complications provided gas is kept flowing through the conduits during shutdown at sufficient velocity to prevent particles falling into and blocking them. Gas that is neutral with respect to the particles of the bed, such as nitrogen or air, in the case of metal oxides, is suitable for this purpose.

The conduit B is tapered with a smaller cross section 53 at the reactor end and is therefore similar in effect to a capped conduit in which the total cross-sectional area of the ports is less than that of the conduit itself. A further modification is shown in the conduit C in which reactor end 54 projects above the hearth surface, thus permitting an unfluidized layer of bed particles on the hearth and thereby substantially eliminating contamination of the fluidized particles with refractory material from the hearth. These conduits are shown without a constricted section at or near their header ends although all can be and preferably are equipped with such a constriction as discussed hereinbefore. A modified form of the constricted conduits shown in FIG. 4 is shown as the tapered conduit D in FIG. 7, with smaller cross section or restricted opening 55 at the header end. A backfire in such a conduit would encounter progressively higher speed gas as it moved through the conduit while in the conduits of FIG. 4, the increase in gas velocity is effected locally at the header end.

Although several arrangements of conduits and headers have been shown and described, any delivery arrangement for feeding the explosive mixture of gases to the fluidized bed in which the following conditions are met is within the scope of the present invention:

1. There must be a multiplicity of conduits connecting a header with the bottom of the fluidized bed.
2. Part of each conduit must extend outside the shell of the reactor to the header to provide a length of exposed conduit that is continually cooled by its surroundings and by the gas flowing therein.
3. The temperature of the header and of the conduits must be sufficiently low to prevent backfiring of an explosive mixture of gases flowing therein.
4. An explosive mixture of gases must enter the fluidized bed at velocities exceeding the ignition velocity of the mixture.
5. The explosive mixture must be supplied to the header at sufficient pressure to satisfy condition 4.

Furthermore, although the present invention provides means for delivery of an explosive mixture of gases to a hot fluidized bed of particles characterized by substantial, rapid and irregular fluctuations in pressure, the practice of the invention is not limited only to those cases in which such pressure fluctuations exist. The same means can be adopted in any fluidized bed operation in which delivery of an explosive mixture of gases to the bed is either necessary or advantageous.

Establishment of hot fluidized beds in accordance with the present invention is found to be simple, fast and efficient, in contrast with prior art practices. An explosive mixture of gases is delivered to a cold, empty reactor according to the means disclosed hereinbefore and ignited in the fluidized bed zone of the reactor thereby generating hot gases by combustion that is sufficiently stable to withstand the addition of cold solid particles at reasonable rates to the reactor without being extinguished. Solid particles are then fed gradually to the reactor, in which they become instantaneously fluidized and rapidly and efficiently heated to the desired temperature in the least possible time relative to a given rate of heat and feed input. The convenience of such means to establish a hot fluidized bed of particles will be immediately appreciated by those experienced in the operation of fluidized beds. The explosive mixture of gases is continuously fed to the reactor to ignite and burn amongst the particles, thus perpetuating both the heating the fluidizing thereof and sustaining in an advantageous manner a suitable environment for the conduct of thermal treatments at elevated temperatures such as the endothermic conversion of metal chlorides by water to metal oxides and hydrogen chloride.

It will be appreciated by those familiar with high-temperature hydrolysis of chlorides that the mere heating of a metal chloride in a reaction chamber in the presence of water at elevated temperatures results in finely divided metal oxide. The special method and apparatus of the present invention as described broadly hereinbefore advantageously permits the conversion of metal chlorides in hot fluidized beds of granular metal oxide particles and the generation of the resulting oxide as adherent deposits on the surfaces of the fluidized particles. There is a considerable variation in the operating conditions which may be selected.

The water vapor with which the chloride reacts, for example, can be generated within or supplied to the reactor by one or more of several techniques:

i. combustion in the bed of a fluidized explosive mixture of gases containing hydrogen-bearing fuel.

ii. evaporation in the bed of water of crystallization in hydrated or partially hydrated metal chloride feed crystals, iii. evaporation in the bed of free water in aqueous metal chloride feed solutions, and iv. direct injection of water or water vapor into the fluidized bed.

Which and how many of these sources are utilized is irrelevant; it is important only that the conversion of the chloride is effected by water rather than by oxygen alone. A preferred practice is to use a hydrogen-containing fuel, such as a gaseous hydrocarbon, and provide any additionally required water in the chloride feed even through the water to chloride ratio can vary greatly from feed to feed. Nickel chloride hydrate crystals, for example, contain 2 to 6 moles of water per mole of chloride and can be supplied conveniently as such or after partial or complete drying. Ferrous chloride present in aqueous solution such as spent hydrochloric acid steel pickling liquors, on the other hand, is more conveniently supplied as pickle liquor than as a solid and is therefore associated with much more water than are nickel chloride crystals. But both are quite suitable feeds since the feed rate of either can be adjusted to deliver enough water, together with that from the combustion of the fuel and other sources, to provide a suitable drive for the chloride conversion reaction, but not so much that fuel consumption for evaporation thereof or dilution of the hydrogen chloride-containing off-gas from the reactor is unnecessarily high.

The metal oxide granules comprising the fluidized bed can be the same oxide that is deposited on them by the conversion of the chloride, different oxides, or mixed oxides, the only stipulation being that they are stable under the operating conditions of the process. Thus, the invention is suitable for the production of both pure and mixed metal oxide granules that can be used as such or that upon reduction yield both pure and alloy granules for a variety of uses. What is more, the granules can contain any number of the metals whose chlorides can be treated by this process, and in any relative quantity and deposition sequence, merely by repeated treatments of the same granules, each treatment with a different metal chloride feed.

The metal chloride feed can be a single, pure chloride or a mixed chloride and can be fed to the fluidized bed as solid chloride crystals containing none, some, or all of their water of crystallization, or as an aqueous solutions such as spent hydrochloric acid steel pickling liquors containing ferrous chloride. Solid chloride is preferably supplied to the fluidized bed through the hearth of the reactor by pneumatic transport in air or nitrogen or other gas that will not adversely affect the chemistry of the process. Although solids can be fed through the top or side of the reactor onto or into the fluidized bed there are serious disadvantages to any method other than bottom feeding. In feeding onto the top of the bed, for example, conversion efficiencies are low because chloride that is volatilized at the surface of the bed is converted to finely divided dusty oxide and blown out of the reactor in the off-gases rather than being deposited on bed particles as occurs with chloride volatilized within the bed. In feeding below the surface of the bed through the wall of the reactor conversion to granular oxide is again inefficient because much of the chloride deposits as oxide on the wall of the reactor above the chloride feed inlet. This problem is overcome by feeding into the bed through a tube that extends inwardly from the wall of the reactor but then other problems arise. Apart from the fact that the tube becomes badly attacked by the hot corrosive gases in the bed and must be replaced from time to time, it also becomes blocked by oxide that forms on the outlet end and must be reamed open regularly to permit continued feeding. By feeding through the bottom, however, the chloride is presumably swept clear of the inlet before conversion commences but, whatever the explanation, no blockages occur and conversion efficiencies are the highest obtained. Unlike solid chlorides, aqueous chloride solutions are most conveniently fed through the roof of the reactor onto the surface of the bed either as streams or sprays.

In addition to nickel, cobalt and ferrous chlorides, magnesium chloride and manganese chloride can also be treated by the present process to yield granular magnesium oxide and manganese oxide, and in principle the process is suitable for the formation of granular oxide of any metal whose chloride is convertible by water vapor to oxide within the operating temperature range of the process. The chloride can also be fed in admixture with other compounds such as oxides, hydroxides, carbides, nitrides, borides and the like in finely divided form for the preparation of special materials such as dispersion-strengthened metals. Nickel chloride can be fed as an aqueous slurry of nickel chloride crystals in admixture with a relatively small proportion of thorium chloride or hydroxide, for example, and the latter is deposited together with the nickel oxide as a composite material that on reduction yields thoria-dispersed nickel.

The fuel can be any fuel that can be mixed with a free oxygen-containing gas to form an explosive mixture of gases and which will combust in the fluidized bed and provide sufficient heat and gas to maintain the bed in a fluidized condition at the desired elevated temperature. Hydrocarbon fuels such as methane, propane, butane, kerosene, naphtha, and the like are preferred, as mentioned above, but other fuels such as carbon monoxide can also be used.

The total amount of oxygen supplied as a free oxygen-containing gas is preferably sufficient to combust substantially all the fuel, thus ensuring not only that the maximum possible heat is released to meet the requirements of the endothermic conversion of the metal chloride but also that no residual fuel remains for the reduction of oxide to metal that might stick to other particles, or to the walls of the reactor, and lead to eventual defluidization of the bed.

Reduction of metal oxide particles is a serious disadvantage and is not necessarily eliminated merely by ensuring that the fuel is completely combusted. When fuel is supplied to the reactor separately as in prior art processes tremendously reducing conditions exist locally near the fuel inlet and reduction of oxide particles can therefore occur even if sufficient oxygen is supplied for complete combustion. The extent and consequences of such reduction differ with the stability or reducibility of the oxide, of course, and consequently might be negligible with relatively stable oxides such as magnesia but severe with relatively reducible oxides such as those of nickel, cobalt and iron.

The present invention provides means for the delivery to the reactor of fuel and a free oxygen-containing gas together as a mixture that is not only explosive but also nonreducing with respect to the oxide particles thereby eliminating not only local reducing and oxidizing conditions but also the need for mixing of fuel and air within the reactor. Thus, heat is generated instantly by ignition of the explosive mixture on entry into the reactor and to thereby avoid reducing conditions in the gases formed, combustion is not only complete but also so efficient that substantially only the stoichiometric quantity of oxygen required for complete combustion of the fuel need be provided.

Delivery of the fuel and free oxygen-containing gas together as an explosive mixture is essential to formation of the dense, coarse, dust-free oxide granules that are characteristic of this process. In contrast with prior art processes for the recovery of hydrochloric acid from spent steel pickling liquors as referred to previously in which substantially all the oxide is carried out of the reactor by the off-gas and is recovered in cyclones, as little as 7 to 15 percent or so of the oxide from the present process is entrained as oxide dust particles in the gas stream leaving the reactor. Vexatious oxide reduction is conveniently eliminated merely by judicious control of the fuel to oxygen ratio of the mixture in relation to the reducibility of the metal oxide present.

As set forth hereinbefore, the fluidized bed is maintained at an elevated temperature and it is to be noted that the fluidized bed can be operated within a considerable range of temperature. Lower limits between about 600° and 700° C. represent the minimum temperatures at which combustion of different explosive mixtures of gases can be sustained within the bed. Combustion must occur in the presence of chlorides, of course, but, in spite of the reputation of chlorides as flame extinguishers, combustion in the present process occurs efficiently and at substantially the same temperatures as those at which combustion of the same mixtures is effected in the absence of chlorides. Upper limits relate to the maximum temperatures that can be tolerated by the materials of construction of the apparatus rather than to process limitations. Higher temperatures favor the chemistry, in fact, because the degree of conversion of chloride to granular oxide, that is to say the conversion efficiency of the process, increases with temperature, but as the temperature is raised the costs of materials and fuel rapidly outweigh the advantage of increased conversion efficiency. In practice the most satisfactory operating temperature range is between about 800° and 900° C. in which the problems of higher temperature operation are avoided while the kinetics and thermodynamics of the reactions are more favorable than those at lower temperatures. It will be appreciated, for example, that higher concentrations of water vapor are required at 600° C. than at 850° C. to drive the metal chloride conversion reaction and, thus, the higher the operating temperature the lower the water concentration required and consequently the greater the hydrogen chloride concentration in the reactor gases and the more efficient its recovery as hydrochloric acid.

Other factors that are known to increase conversion efficiency are increased bed depth and decreased space velocity. Space velocity, expressed in actual feet per second at reaction temperature, must be at least as great as the minimum required to fluidize the bed, of course, and increases with bed depth, but the latter can be chosen at will as a function of reactor capacity and hearth area. For the relatively dense, coarse oxide particles comprising the fluidized beds in the present process space velocities of about 2.5 to 3.5 feet per second and bed depths of 3 to 5 feet have been found satisfactory for commercial operation.

One of the reasons for the high conversion efficiencies of this process is thought to be the unusual movement imposed on the metal oxide particles in the fluidized bed by control of the physical characteristics thereof. As previously set forth, the granular particles referred to herein vary in size between about 8 and 100 Tyler mesh but are predominantly within a relatively narrow range, such as, for example, −20+65 Tyler mesh and, in addition, the particles are dense and their surfaces are smooth and rounded. When gas is passed upwardly at fluidizing velocities through a bed of such particles fluidization is wildly uneven and particles are ejected continually and violently into the freeboard zone above the fluidized bed zone where they are cooled somewhat before falling back into the bed. Metal chloride is therefore presumably condensed or sub sublimed onto the surfaces of these somewhat cooler particles on reentry into the bed and converted thereon to metal oxide and this cyclic process of ejection, cooling, condensation or sublimation, and conversion is repeated continuously to cause growth of the bed particles by incremental buildup of thin coatings of metal oxide.

This feature is of particular importance in the case of nickel chloride which sublimes at conversion temperatures but does not melt. Although it is not known whether sublimation of nickel chloride onto the surfaces of the metal oxide particles of the bed is the only mechanism by which transfer of nickel occurs from chloride to granular oxide it is undoubtedly a major one as demonstrated by the remarkable conversion efficiencies resulting from this special particle movement in the bed that is conducive to sublimation. In the case of chlorides that are molten at conversion temperatures it is presumed that oxide particles in the fluidized bed become coated with molten chloride that is converted in situ on the surfaces of the oxide particles but the cooling effected by ejection of particles from the fluidized bed is still important for the efficient condensation of metal chloride vapor that coexists in the bed with molten chloride. Thus, according to the present invention, the properties of the oxide particles are controlled so that the resulting fluidization characteristics are conducive to high conversion efficiencies and means are provided to permit the safe delivery of an explosive mixture of fuel and a free oxygen-containing gas to such a fluidized bed.

It will be appreciated that, as fluidized bed deposition in the present process is continued, the average particle size increases and the size range decreases unless finer particles are either continually generated in the reactor or added to it. Such a provision is necessary for the control size and size distribution because with unchecked growth of particles fluidization gradually deteriorates and might quite abruptly cease. Particle size control effected effected readily in the practice of the present process merely by recycling to the reactor the smaller product granules on which further deposition can occur, while recovering as product the substantially larger metal oxide granules. In addition to this source of small particles it is suggested that new small oxide seed particles are generated directly from chloride feed by the conversion reaction itself and that there are middling particles suspended in the freeboard zone between the fluidized bed and the gas offtake from the reactor that move continuously between bed and freeboard and gradually grow to such a size and weight that they can remain in the bed as seed particles. Whatever the mechanism a fine fraction is perpetuated in the bed and the size distribution remains substantially constant throughout the operation.

The small proportion of the chloride feed, as little as 7 to 15 percent or so, that is converted to relatively fine oxide dust particles and carried out of the reactor in the off-gases is recovered either in cyclones or in the hydrogen chloride recovery process. It is unnecessary to present herein a detailed description of the recovery process and it is sufficient to state that substantially all the hydrogen chloride generated is recovered and recycled as hydrochloric acid to leaching or pickling processes for the generation of further quantities of chloride feed for conversion to granular oxide according to this invention.

The overall chemical process occurring in the fluidized bed is a combination of three or four separate processes or reactions that occur simultaneously:

i. combustion of the explosive mixture of fuel and free oxygen-containing gas, ii. evaporation of free water or water of crystallization from the chloride feed, iii. reaction of chloride and water vapor to form oxide and hydrogen chloride, iv. deposition of oxide on the particles of the fluidized bed.

The kinetics and mechanisms of these individual processes are not completely known and consequently neither are those of the overall complex process. It is observed on the one hand that conversion efficiency increases directly with temperature and bed depth and inversely with space velocity. Since it is reasonable to assume that the reaction rate of the process increases with temperature, it is therefore reasonable to infer from these observations that conversion efficiency increases with reaction rate and retention time of reactants in the bed. On the other hand the conversion efficiency has not been shown to increase with a decrease in the size of solid chloride feed particles or an increase in the amount of water vapor available per unit of chloride and yet in both cases reaction rate should be increased. Furthermore, in British Pat. No. 866,363 referred to previously as describing a process for the conversion of titanium tetrachloride to granular titanium oxide in a fluidized bed of titania particles, the chloride was supplied as a vapor that should have greatly favored a high reaction rate and yet even at the relatively slow space velocity of about 1.3 feet per second, no more than about half that of the present process, and at a relatively high reaction temperature of 950° C., conversion efficiency was only 30 percent. The conversion was effected by oxygen rather than by water vapor, of course, but it is nevertheless surprising that in the present process, with coarse solid chloride feed, much higher space velocities of around 3 feet per second and considerably lower bed temperatures of around 850° C., conversion efficiency is commonly between 85 and 95 percent. Thus, although the reasons for the effects that changes in certain variables have on the results of the present process are not clearly known, the results themselves emphasize the advantageous nature of the process and the contribution that the present development constitutes in the art of fluidization and fluidized bed processes.

In practice the process is controlled conveniently by the chloride feed rate as a result of the sequence in which the operating conditions are selected. As in any fluidized bed process the space velocity of the fluidizing gases is of primary importance because it is limited strictly by the physical requirements of fluidization rather than by the chemistry of the process and is therefore open to little choice. Given the physical characteristics of the particles comprising the fluidized bed, the space velocity is automatically fixed within whatever range of values at which satisfactory fluidizing characteristics can be maintained. Furthermore, if the fluidizing gases are reactants in the process, as in the present case, then the input of these reactants for a given hearth area and fluidizing gas composition is automatically fixed by the space velocity, which in such a case is therefore a limiting factor in the chloride throughput of the reactor. In the present process other parameters affecting throughput are the bed temperature and the properties of the chloride feed. The fluidizing gases provide heat to meet the endothermic requirements of the chloride conversion reaction at a selected bed temperature in a reactor with certain heat-loss characteristics. For a given total heat input, then, the lower the temperature of the bed and the lower the water concentration of the chloride feed the more the heat available for the endothermic conversion and therefore the higher the chloride throughput of the reactor. Thus, having selected the bed temperature the throughput is dependent entirely on the properties of the chloride feed and control of the feed rate, therefore, provides convenient control of bed temperature. Selection of the values of operating parameters for any given reactor is thus conveniently made in the following sequence:

i. Physical properties of the bed (size, shape and density of the particles, depth, etc.),
ii. Space velocity of fluidizing gases,
iii. Temperature of the fluidized bed, and
iv. Properties of the chloride feed (composition, specific heat, endothermic heat of reaction, etc.).

Having fixed these variables the fluidized bed is established as described above and chloride feed is delivered thereto at whatever rate is required to maintain the desired bed temperature thereby automatically fixing the chloride throughput.

For the purpose of giving those skilled in the art a better understanding of the invention, the following illustrative examples are given:

EXAMPLE 1

In a pilot plant operation for the conversion of nickel chloride to granular nickel oxide, a fluidized bed reactor similar to that shown in FIGS. 1 and 2 with a 500 mm. diameter hearth was used for the conversion. The explosive gas entry means on the reactor was similar to that shown in FIGS. 1 and 2, with the header consisting of two circular metal plates about 15 mm. thick and 560 mm. in diameter separated by a metal ring of the same size plate with the same outside diameter and 500 mm. internal diameter sandwiched between them, thereby enclosing a volume of about 3 liters. Nine conduits, arranged in two concentric circles and as shown in FIG. 2, were connected between the header and reactor hearth and were each about 400 mm. long, 100 mm. thereof being exposed outside the steel shell of the reactor, and the remainder being embedded in the refractory hearth of the reactor. Each conduit had an internal diameter of 8 mm. and was constricted to 6 mm. at the end within the header.

Propane and air were supplied at a pressure of 0.66 kg./cm.$^2$ gauge through separate lines to a mixing zone at rates of 4.4 and 120 Nm$^3$/hr. respectively. The explosive mixture flowed through the inlet into the header and thence through each conduit into the fluidized bed zone of the reactor. The velocity of the gas through the constricted section of each conduit was 107 m./sec. and through the unconstricted conduit was 60 m./sec., both velocities many times greater than the ignition velocity of the mixture, about 0.5 m./sec. The temperature of the header and conduits was about 120° C., well below the ignition temperature of the mixture of about 470° C. The mixture was ignited in the cold reactor to generate hot fluidizing gas and it burned therein without backfiring.

Nickel oxide granules ranging in size between about 14 and 100 Tyler mesh but predominantly between the relatively narrow range of 20 to 65 mesh and with a bulk density of about 4 g./cm.$^3$ were then fed at a rate of 60 kg./hr. to the reactor in which they became instantly fluidized and quickly heated to the desired operating temperature of 900° C. Heating of the cold reactor continued under these conditions for 8 hours by which time the fluidized bed was about 0.9 m. deep and the gas pressure at the bottom of the bed averaged about 0.2 kg./cm.$^2$. In spite of substantial, rapid and irregular fluctuations in this pressure no backfiring occurred.

Nickel chloride particles containing 10 percent by weight water of crystallization and 1.5 percent by weight NiO were then pneumatically fed by air through the hearth of the reactor into the bottom of the fluidized bed at a rate of 65 kg./hr., the air being supplied at a rate of 15 Nm$^3$/hr. The nickel chloride reacted with its own water of crystallization and that generated by combustion of the propane, and nickel oxide was deposited on the nickel oxide granules while hydrogen chloride was generated in the gas phase which contained 13.7 percent by volume HCl on a dry basis and passed through the bed at a space velocity of about 0.8 actual meters per second. Nickel oxide granules with a bulk density of about 4 g./cc. overflowed the bed down an inclined pipe and were discharged from the reactor at a rate of 36.5 kg./hr., equivalent to a conversion efficiency of nickel chloride to granular nickel oxide of 83 percent. The nickel oxide granules discharged had a screen analysis (Tyler mesh) of 0.2% +14, 0.3% −14+20, 32.2% −20+28, 14.1% −28+35, 9.5% −35+48, 26.3% −48+65 and 17.3% −65. The discharged granules were divided into a coarse product fraction and a fine recycle fraction by a slotted screen approximately equivalent to 35 Tyler mesh and the recycle fraction was returned to the reactor at a rate of 7.8 kg./hr. in accordance with the procedure described in conjunction with FIG. 1. The coarse product fraction has a screen analysis of 0.8% +14, 4.4% −14+20, 21.3% −20+28, 46.6% −28+35, 24.6% −35+48 and 2.3% −48.

The hydrogen chloride in the off-gas from the reactor was recovered as acid and used in the production of further quantities of nickel chloride while nickel oxide in the off-gas was recovered and recirculated to the reactor.

EXAMPLE 2

The pilot reactor referred to in Example 1 was operated in the manner described under a variety of conditions as set forth in Table I following, which also shows the corresponding metallurgical data and the data of Example 1 for comparison (shown as Run No. 1). The flexibility of the operation is self-evident.

TABLE I

| Operating conditions and metallurgical data | Run No. 1 | Run No. 2 | Run No. 3 |
| --- | --- | --- | --- |
| Fuel-air mixture: | | | |
| Fuel type | Propane | Naphtha | Naphtha |
| Rate: | | | |
| Nm.$^3$/hr | 4.4 | | 3.2 |
| Kg./hr | | 6.5 | |
| Air rate, Nm.$^3$/hr | 120 | 100 | 85 |
| Bed temperature, ° C | 900 | 900 | 850 |
| NiCl$_2$ feed: | | | |
| NiCl$_2$ moisture, percent | 10.− | 9.− | 10.− |
| NiO, percent | 1.5 | 0.2 | 0.4 |
| Rate, kg./hr | 65 | 37 | 50 |
| Feed gas type | Air | Air | Air |
| Rate, Nm.$^3$/hr | 15 | 15 | 15 |
| Operating space velocity, actual meters/sec | 0.80 | 0.68 | 0.64 |
| NiO product: | | | |
| NiO discharge rate, kg./hr | 36.5 | 22.5 | 33.3 |
| Conversion efficiency, percent | 83 | 83 | 71 |
| −35 mesh recycle rate, kg./hr | 7.8 | 7.8 | 15 |
| Operating Time, hrs | 40 | 95 | 83 |

EXAMPLE 3

The conversion of ferrous chloride in aqueous solution to granular iron oxide was conducted in a 180 mm. diameter reactor with gas entry means similar in basic design to that of the larger reactor described in Example 1 but equipped with only five conduits for the supply of explosive mixtures of gases to the fluidized bed. Propane and air were mixed and supplied to the fluidized bed reactor substantially as in Example 1 at rates of 0.69 and 16.25 Nm$^3$/hr. respectively and 15 kg. of substantially −20 mesh granular iron oxide particles were fluidized and heated in the reactor by passing through and combustion in it of the explosive propane-air mixture. Ferrous chloride was supplied to the fluidized bed in an aqueous solution of specific gravity 1.205 and at a temperature of 20° C. with the following composition in grams per liter:

| $Fe^{2+}$ | Fe total | HCl |
| --- | --- | --- |
| 95 | 97 | 75 |

A total of 65.5 liters of this solution, similar in composition to a spent HCl steel pickling liquor, was fed as a stream through the top of the reactor and onto the fluidized bed at a rate of 6.8 l./hr. for 9.5 hr. and reacted therein at 780° C. The increase in the weight of fluidized granular iron oxide particles was equivalent to 5,462 g. of iron or about 86 percent of that fed to the bed in solution. The effect of this process on the particle size and size distribution of the granular particles is illustrated in Table II by the size analysis of the material in the bed at the beginning and end of the run.

TABLE II

| Material | Tyler mesh, wt. percent on | | | | | | |
|---|---|---|---|---|---|---|---|
| | 20 | 28 | 35 | 48 | 65 | 100 | −100 |
| Initial bed | 0.2 | 1.3 | 10.8 | 44.8 | 34.8 | 6.4 | 1.7 |
| Final bed | 1.6 | 4.9 | 27.5 | 53.5 | 11.8 | 0.6 | 0.1 |

EXAMPLE 4

Tests were carried out in a 100 mm. diameter reactor with a conical bottom and a single gas inlet, an impracticable design for a commercial reactor but convenient for laboratory studies. A variety of runs was made under different conditions and the data for some of these are shown in Table III to illustrate certain features of the invention.

TABLE III

| Run | Feed | | Fluidized bed particles | Fuel | Fluidized bed T., ° C. | Conversion efficiency, percent |
|---|---|---|---|---|---|---|
| | Chloride | H₂O, wt. percent | | | | |
| 1 | FeCl₂ | 21.5 | Fe₂O₃ | Propane | 820 | 92 |
| 2 | FeCl₂ | 17.5 | NiO₃ | do | 900 | 92 |
| 3 | FeCl₂ | *83 | NiO₃ | do | 810 | 87 |
| 4 | CoCl₂ | 30.5 | NiO₃ | do | 810 | 80 |
| 5 | NiCl₂ | 1.0 | NiO₃ | Methane | 920 | 85 |
| 6 | NiCl₂ | 4.0 | NiO₃ | Propane | 840 | 87 |
| 7 | NiCl₂ | 1.0 | NiO₃ | Butane | 775 | 93 |
| 8 | NiCl₂ | 4.5 | NiO₃ | Kerosene | 700 | 71 |
| 9 | NiCl₂ | 4.5 | NiO₃ | do | 810 | 95 |

*Aqueous solution.

The conversion efficiency was at least 80 percent and closer to 90 percent in all but one case, Run 8. Conversion was improved over Run 8 at higher temperature, however, as shown in Run 9. The bed temperatures for the series of fuels in Runs 5 to 8 inclusive were not necessarily the lowest possible operating temperatures in each case but were representative for those fuels and illustrate not only that a variety of fuels can be used but also that the longer the hydrocarbon chain of the fuel the lower the temperature at which combustion can be readily sustained regardless of chloride conversion efficiency. Runs 1 to 4 inclusive show not only that FeCl₂ can be fed equally well as a solid or as an aqueous solution but also that the metal oxide particles of the bed can be of different metal than that of the chloride feed. The metal oxide particles obtained from each run were dense and granular with substantially smooth and rounded surfaces.

The method of the invention is found to be most advantageous for the treatment of high purity nickel chloride, such as that obtained by the hydrochloric acid leaching of nickel matte, as described in U.S. Pat. No. 3,085,054. In the process of this patent very high purity nickel chloride crystals are obtained having an impurities level of less than 0.1 percent and often in the order of 500 parts per million. Thus, a typical nickel chloride product obtained by the process of this patent had impurities levels (in parts per million) as shown in Table IV.

TABLE IV

| Element: | P.p.m. |
|---|---|
| Ca | 127 |
| Mg | 21 |
| Al | 29 |
| Si | 30 |
| Fe | 240 |
| Co | <13 |
| Cu | 11 |
| S | 60 |
| Pb | 11 |
| Total | 542 |

Figure 8:
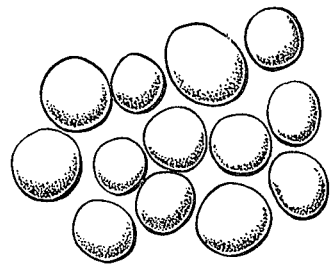
FIG. 8 is a photograph at 17× of nickel oxide granules obtained by the process of the present invention.

Treatment of this material according to the process described herein produces coarse nickel oxide granules of high purity having a bulk density in the order of 4 grams per cubic centimeter and a particle size in the order of 8 to 100 Tyler mesh. Usually a product substantially between about 20 and 48 Tyler mesh is obtained. The nickel oxide product is granular and dust-free and has substantially smooth and rounded surfaces, a nickel content in the order of 79 percent and a total impurity content of less than about 0.1 percent. The smooth and rounded nature of the surfaces of the granules of this novel nickel oxide product is illustrated by FIG. 8 of the drawings which is a reproduction of a photograph of some of these granules magnified × 17. The uniformity of the product is also well illustrated by FIG. 8. A characteristic of the product of the invention is its tendency to intergranular sintering of adjacent granules upon reduction of a body of the granules at 550° C. for 1 hour in a flowing stream of hydrogen.

It is to be noted that certain characteristics of the nickel oxide product of the invention are substantially different from any other granular nickel oxide product of the prior art. Heretofore, any granular nickel oxide product produced by the prior art has been composed of particles which, unlike the granules of the product described herein, are rough and knobbly, having substantially irregular and uneven surfaces. Furthermore, in the reduction of any granular nickel oxide product of the prior art no mention has been made of sintering, sticking and fusing between particles as is characteristic of the present novel product. The tendency to stick may be due in part to the high purity of the product of the present invention (less than 1,000 parts per million of impurities) as compared with prior art nickel oxide granules which generally have an impurity level in the order of more than 2 percent (more than 20,000 parts per million).

The high purity of the nickel oxide product of the present invention is illustrated in Table V which sets forth impurity levels present (in parts per million based on nickel metal) in nickel oxide granules produced in accordance with Example 1.

TABLE V

| Element: | Run 1, p.p.m. |
|---|---|
| Ca | 71 |
| Mg | 50 |
| Al | 22 |
| Si | 16 |
| Fe | 282 |
| Co | <13 |
| Cu | 10 |
| S | 3 |
| Pb | 11 |
| C | 45 |
| Cl | 100 |
| Total | 623 |

The granular nature of the nickel oxide product of the invention and uniform size thereof is clearly illustrated by the screen analysis (Tyler mesh) of the coarse product fraction produced by the operation described in Example 1.

EXAMPLE 5

While the above examples refer to the endothermic conversion of metal chlorides to oxides the present example describes the conduct of an exothermic reaction at elevated temperature, i.e., the combustion of carbonaceous resins used as binders in the manufacture of sand shell moulds for metal castings, and thereby both emphasizes and further illustrates the breadth of application of the present invention.

Shell moulds are made of sand particles about 65 to 150 Tyler mesh in size, bonded together by resins. Thus, to recover the sand in used shell moulds it is necessary to destroy the binders, conveniently by burning, and reclaim the sand as individual free particles. Although the moulds must be heated to a temperature at which such burning can be initiated, a considerable amount of the heat required to maintain the temperature and sustain the reaction is generated by the reaction itself, unlike the conversion of metal chlorides with water described above.

The fluidized bed zone of the reactor in which the present test was carried out was about 180 mm. in diameter and four conduits were arranged symmetrically about the center of the hearth for the entry of an explosive fuel-air mixture to the bed according to the present invention. Thus, air and propane were mixed under pressure outside the reactor at flow rates of 17.5 and 0.48 Nm³/hr. respectively and the explosive mixture was delivered to the fluidized bed zone through the four conduits and ignited. Used sand shell moulds were crushed to pass 3 Tyler mesh and fed through the top of the reactor at a rate of about 10 kg./hr. The temperature of the resulting fluidized bed was about 1,000° C. and the free space velocity of the gases therethrough was about 0.9 actual meters per second. During establishment of this fluidized bed the resin binders in the mould pieces burned thereby freeing individual sand particles from the pieces, widening the particle size distribution of the material comprising the bed and improving the fluidization characteristics of the bed. About 40 percent or so of the material leaving the bed was removed through an inclined overflow pipe at the top of the fluidized bed and the remainder was entrained in the off-gases and collected in a cyclone.

Having established this stable well-fluidized bed, the air and propane rates were adjusted to 19.1 and 0.35 Nm³/hr. respectively to provide a higher proportion of excess air for combustion of the resin binders and feeding of −3 Tyler mesh mould pieces with a carbon content of 4.8 percent was continued at a rate of about 19.5 kg./hr. In spite of this increased feed rate a bed temperature of 1,000° C. was sustained because of the heat generated by combustion of the resin. About 58 percent of the product overflowed the bed with a carbon content of about 0.6% C while the remainder was recovered in the cyclone with about 2.8% C. This higher carbon tenor was clearly the result of short-circuiting and could be decreased by feeding below the top of the bed rather than through the top of the reactor. Nevertheless overall carbon elimination was about 70 percent and the combined overflow and cyclone products had the particle size distribution shown in Table VI following, indicative of substantially free sand particles:

TABLE VI

| Particle size Tyler mesh: | Wt. percent on |
|---|---|
| 10 | Nil |
| 65 | 3.9 |
| 100 | 13.7 |
| 200 | 62.8 |
| −200 | 19.6 |

The advantages and potential of the present invention are well illustrated by this further application thereof to the convenient and effective reclamation of sand used in the preparation of foundry shell moulds.

What we claim as our invention is:

1. A method for producing dense metal oxide granules and hydrogen chloride by reaction of metal chloride with water which comprises
   i. establishing in a reactor at an elevated temperature a fluidized bed of dense metal oxide granules having a predominantly narrow size range thereby causing frequent pressure fluctuations in the bed, ejection of granules upwardly therefrom and return of ejected granules thereto by gravity,
   ii. preparing an explosive mixture of a fuel-gas and a free oxygen-containing gas outside the reactor at a temperature below the ignition temperature of the mixture,
   iii. dividing the mixture into a multiplicity of streams,
   iv. maintaining each stream at a temperature below the ignition temperature of the mixture by cooling a portion of each stream outside the reactor,
   v. separately directing each stream into the bottom of the fluidized bed at velocities exceeding the ignition velocity of the mixture,
   vi. combusting the mixture of gases within the bed thereby generating hot fluidizing gases and maintaining the bed in a fluidized condition at an elevated temperature,
   vii. supplying to the bed water and metal chloride selected from the group consisting of nickel chloride, cobalt chloride, ferrous chloride, magnesium chloride, manganese chloride and mixtures thereof, as solid particles or as aqueous solutions,
   viii. reacting the metal chloride and water within the bed in contact with the oxide granules thereby depositing fresh adherent metal oxide on the surfaces of the granules and forming hydrogen chloride.

2. A method according to claim 1 wherein the metal chloride is a single metal chloride.

3. A method according to claim 1 wherein the metal chloride is a mixture of metal chlorides.

4. A method according to claim 2 wherein the metal chloride is nickel chloride.

5. A method according to claim 2 wherein the metal chloride is nickel chloride and the free oxygen content of the explosive mixture is at least sufficient for complete combustion of the fuel gas.

6. A method according to claim 2 wherein the metal oxide granules contain oxide of the metal in the metal chloride.

7. A method according to claim 2 wherein the metal oxide granules contain oxide of a metal other than that in the metal chloride.

8. A method according to claim 3 wherein the metal oxide granules contain oxide of a metal in the metal chloride.

9. A method according to claim 3 wherein the metal oxide granules contain oxide of metal other than any in the metal chloride.

10. A method according to claim 1 wherein the fuel-gas is a gaseous hydrocarbon.

11. A method according to claim 1 wherein the explosive mixture and the gases formed by the burning thereof are non-reducing with respect to the oxide on the surface of the oxide particles.

12. A method according to claim 1 wherein the metal chloride is ferrous chloride.

13. A method according to claim 1 wherein the metal chloride is fed onto the top of the fluidized bed in an aqueous solution.

14. A method according to claim 1 wherein the metal chloride is in the form of solid particles and is fed pneumatically upwardly into the bottom of the fluidized bed.

15. A method according to claim 1 wherein water is supplied to the fluidized bed from one or more of the sources selected from the group consisting of water contained in gases resulting from the combustion of hydrogen-containing fuel, water of crystallization in solid metal chloride, water in aqueous solution of metal chloride and water fed independently to the bed.

16. A method according to claim 1 wherein the average particle size of metal oxide granules recovered from the fluidized bed is larger than that of the metal oxide granules supplied to the fluidized bed.

17. A method according to claim 1 wherein the metal oxide granules recovered from the fluidized bed are separated into a coarse product fraction and a fine fraction and the fine fraction is returned to the fluidized bed.

* * * * *